United States Patent [19]

Cheung

[11] 4,178,318

[45] Dec. 11, 1979

[54] GRAFT POLYBUTADIENE COPOLYMERS

[75] Inventor: Mo-Fung Cheung, Warren, Mich.

[73] Assignee: Ford Motor Company, Dearborn, Mich.

[21] Appl. No.: 900,381

[22] Filed: Apr. 26, 1978

[51] Int. Cl.$^2$ .................... C08F 271/00; C08L 51/00; C09D 3/727

[52] U.S. Cl. ................ 525/77; 260/32.8 N; 260/33.4 R; 260/33.6 UA; 428/335; 428/447; 428/462

[58] Field of Search ............ 428/447, 462; 260/827, 260/836, 879, 880 R, 876 R

[56] References Cited

U.S. PATENT DOCUMENTS

| | | | |
|---|---|---|---|
| 3,113,036 | 12/1963 | Schwarzer | 117/75 |
| 3,170,806 | 2/1965 | Syrchek | 106/285 |
| 3,206,432 | 9/1965 | Schwarzer | 260/63 |
| 3,223,655 | 12/1965 | Murdock | 260/4 |
| 3,297,623 | 1/1967 | Knapp et al. | 260/29.7 |
| 3,318,971 | 5/1967 | Chloupek et al. | 260/826 |
| 3,365,411 | 1/1968 | Mertzweiller et al. | 260/29.7 |
| 3,468,836 | 9/1969 | Sekmakas | 260/33.6 |
| 3,551,525 | 12/1970 | Wilhelm et al. | 260/881 |
| 3,639,216 | 2/1972 | Sakuma | 204/30 |
| 3,796,770 | 3/1974 | Daimer et al. | 260/839 |
| 3,897,260 | 7/1975 | Yaginuma et al. | 106/287 R |
| 3,904,563 | 9/1975 | Shingai et al. | 260/22 CB |

*Primary Examiner*—Stanford M. Levin
*Attorney, Agent, or Firm*—Edmund A. Ross, Jr.; Olin B. Johnson

[57] ABSTRACT

Graft copolymers of low molecular weight aliphatic conjugated diolefin polymers of high 1,2 vinyl content with acrylic monomers including certain acrylamide monomers grafted thereon provide alkaline resistant primer compositions that may be formulated into water base and solvent base compositions. The primer compositions may contain additional aliphatic conjugated diolefin polymer, hydroxy silicones, and crosslinking agent for increased solids content and improved properties.

18 Claims, No Drawings

GRAFT POLYBUTADIENE COPOLYMERS

BACKGROUND OF THE INVENTION

This invention concerns primer compositions comprising aliphatic conjugated diolefin polymer with acrylic portion grafted thereon. These graft copolymers can impart high alkaline resistance to primer coatings.

Constituent monomers of this invention that are grafted onto the aliphatic conjugated diolefin polymer include etherified N-methylolacryamide monomers and acrylic functional monomers. Further, it is essential that the aliphatic conjugated diolefin polymer comprise a high content of 1,2 vinyl units.

U.S. Pat. No. 3,297,623 discloses graft copolymers comprising aliphatic conjugated diolefin polymer backbone that has grafted thereon certain methylol acrylamide monomers. U.S. Pat. No. 3,297,623, however, differs in several respects from the invention herein including, in particular, the use therein of aqueous latex grafting, lack of disclosure relating to high vinyl content as well as failure to include hydroxyfunctionality for enhanced crosslinking. Other graft copolymers possibly of interest are disclosed in U.S. Pat. No. 3,206,432 and U.S. Pat. No. 3,113,036, which, however, disclose graft copolymers with aliphatic conjugated diolefin polymers having high 1,4 addition configuration. Still another graft copolymer is disclosed in U.S. Pat. No. 3,639,216.

Certain etherified N-methylolacryamide monomers suitable herein for grafting have been disclosed as suitable for inclusion in acrylic copolymer coating systems as in U.S. Pat. No. 3,551,525. In that disclosure, however, no graft copolymers are made.

An aspect of this invention is that the graft copolymer made as hereinafter disclosed under certain nonaqueous solution polymerization conditions, further can be combined with additional aliphatic conjugated diolefin polymer to provide increased solids content yet not deleteriously detract from the physical properties of the cured film when properly formulated and cured. U.S. Pat. Nos. 3,170,805, 3,365,411 and 3,897,260 all relate to blended aliphatic conjugated diolefin resins but do not disclose the use of graft copolymers as herein.

Another aspect of this invention includes the use of additional crosslinking agents to improve the properties of the cured film. U.S. Pat. No. 3,223,655 discloses the use of graft copolymers containing an acrylic portion that is crosslinked with added crosslinker but the primers therein are said to be useful with a low content, e.g. 2–20% by weight aliphatic conjugated diolefin polymer. Similarly, U.S. Pat. No. 3,796,770 discloses an adduct of diene polymer and unsaturated carboxylic acid monomer that is crosslinked with added crosslinker but the monomer content is quite different than herein.

Still another aspect of this invention is the improvement in properties obtained through the inclusion of hydroxy functional silicones into the primer compositions. U.S. Pat. No. 3,318,971 and U.S. Pat. No. 3,468,836 disclose hydroxy silicones in coating compositions. These patents also disclose a special advantage of hydroxy functional silicones with, for example, certain N-methylolacryamide functionality. But these patents do not disclose the use of acrylic graft copolymers made with aliphatic conjugated diolefin polymers as herein for use with hydroxy functional silicones.

THE INVENTION

This invention concerns primer compositions that comprise acrylic graft copolymers made from low molecular weight aliphatic conjugated diolefin polymers of high 1,2 vinyl content. The grafted acrylic portion provides a self-crosslinking through certain acrylamide functionality which is enhanced by inclusion of certain hydroxy functionality. The primer compositions may contain additional crosslinking agents.

Neither aliphatic conjugated diolefin polymer nor separate acrylic polymer made of grafting monomers is seen to exhibit the high level of alkaline resistance and consequent corrosion resistance of the graft copolymer herein. Thus, the high alkaline resistance that can be obtained with the graft copolymer herein is a new property not seen with either system alone or in physical combination.

The alkaline resistance of graft copolymers herein can be still further modified and improved, when certain hydroxy silicones included with the graft copolymer before curing. Further, additional aliphatic conjugated diolefin polymer itself may be advantageously used to increase solids content of the primer composition without significant loss in the properties of the cured system. Moreover, additional crosslinking agents as amino resins may be advantageously employed for increased crosslinking density as well as other improved properties of the cured coating.

By use of certain polymerization catalysts including grafting catalysts and nongrafting catalysts particularly efficient grafting can be made to occur and graft copolymers of particularly high alkaline resistance are achieved.

The graft copolymers may be formulated into nonaqueous primer compositions or alternatively, into aqueous primer compositions by reaction of certain of the graft copolymers with, for example, amines. Thus, graft copolymers made from high levels of carboxy functional monomers may be neutralized with amines to form water soluble and dispersible resins for water base systems. Also, by reaction of certain epoxy containing graft polymers with amines, resins suitable as electrodepositable compositions may be obtained.

DETAILED DESCRIPTION OF THE INVENTION

A. Aliphatic Conjugated Diolefin Polymer

The aliphatic conjugated diolefin polymer starting materials suitable herein include those which are normally liquid and, preferably, have a number average molecular weight of about 1000–20,000, more preferably about 1000–5000. The polymers may be homopolymers of conjugated diolefin monomers (by conjugated diolefin monomer is meant an aliphatic polymerizable compound (preferably hydrocarbon) with two double bonds separated by a carbon to carbon bond) or copolymers, terpolymers, etc. thereof with other aliphatic monomers, e.g., acrylonitrile, acrylic or methacrylic acid esters as butyl methacrylate or ethylacrylate, as well as with aromatic monomers such as vinyl aromatics as styrenes, vinyl toluenes, etc. Preferred aliphatic conjugated diolefin polymers include those comprising hydrocarbon conjugated diolefin monomers of 4–6 carbons, e.g., 1,3 butadiene and especially homopolymers thereof, as well as polymers including vinyl aromatics as styrenes, particularly styrene and 1,3 butadiene copolymers and polymers of these with other monomers. Normally the conjugated diolefin monomer will comprise more than about 30 mole percent of the conjugated diolefin polymer, preferably in a range above about 40 mole percent.

It is important that the aliphatic conjugated diolefin polymer contain about 40-90% on a molar basis, based on conjugated diolefin units, conjugated diolefin units that are added to result in 1,2 vinyl configuration. This 1,2 vinyl configuration is illustrated as:

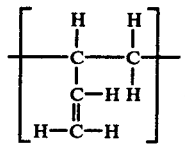

and is to be distinguished from 1,4 addition wherein the double bond is primarily within the polymer backbone. For aliphatic conjugated diolefin polymers as polybutadiene and combinations of 1,3 butadiene and vinyl aromatics as styrene, it is preferred that the polymer be mostly of 1,2 vinyl content (e.g. at least about 50 mole percent) more preferably at least about 60 mole percent based on the number of moles of 1,3 butadiene present.

B. The Grafting Monomers

About 10-60 % by weight of the graft copolymer comprises grafted olefinically unsaturated monomers that are copolymerizable with one another.

About 10-40 mole percent of these olefinically unsaturated monomers comprise one or more acrylamides corresponding to the formula:

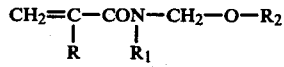

wherein R is hydrogen or methyl, $R_1$ is hydrogen or $C_1$-$C_8$ alkyl, $R_2$ is hydrogen or $C_1$-$C_8$ alkyl (preferably branched chain alkyl of 3-8 carbons e.g. isobutyl, isopentyl).

The self-crosslinking efficiency of the graft copolymer during curing of the primer composition is enhanced when about 5-40 mole percent of the grafting monomers comprise hydroxy-functional monomers, especially hydroxyalkylacrylates or methacrylates as hydroxy propyl methacrylate or acrylate and particularly $C_2$-$C_8$ monohydroxy substituted alkyl esters of acrylic or methacrylic acid. Hydroxy functionality may be additionally incorporated by including with the grafting monomers epoxy acrylates as glycidyl acrylates or methacrylates that, after graft polymerization, are reacted with amines as diethyl amine or the like to provide hydroxy groups. The epoxy functional acrylics may be the same as the hydroxy functional acrylics with the exception, of course, that the hydroxy group is a 1,2 epoxy at the terminal carbons of the oxyalkyl portion. The amine is preferably a monoamine and especially a di-lower alkyl monoamine. Preferably, the amine will have a total up to about 12 carbons. Preferred epoxy functional monomers correspond to the formula:

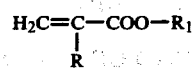

wherein R is hydrogen or methyl and $R_1$ is alkyl that has a terminal 1,2 epoxy group.

Preferred monomers for adding hydroxy functionality to the graft copolymer are hydroxy acrylics, especially those corresponding to the formula:

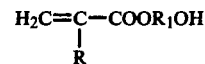

wherein R is hydrogen or methyl; $R_1$ is a divalent hydrocarbon of up to eight carbons and especially branched chain $C_2$-$C_8$ alkylene, more preferably branched $C_2$-$C_6$ alkylene wherein the hydroxy is on a primary or secondary carbon.

About 0-25 mole percent of grafting monomers, more preferably about 0.5-25 mole percent (especially 3-15 mole percent) of grafting monomers comprise carboxy functional acrylic monomer which contains carboxylic acid functionality e.g., acrylic acid or methacrylic acid. Preferred monomers comprising acid functionality correspond to:

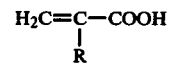

wherein R is hydrogen or methyl.

Higher levels, e.g. about 10-25 mole percent carboxy functional monomers may be advantageously used when formation of water-base primers is desired. Neutralization of the carboxy with, for example, water-soluble amino compounds as di-loweralkyl amines, e.g. diethylamine and dibutylamine or other bases as hydroxides provides anodic deposition resins. Thus, for example, in embodiments wherein the primers are to be for water-base systems, the graft copolymer may be neutralized by amino alcohols as ethanolamines. Further, for other water-base embodiments (e.g. cathodic) the acid functionality may be replaced by epoxy functionality e.g. glycidyl acrylates or methacrylates which are then reacted with organic amines to form a water-dispersible resin upon neutralization with acid. Preferred glycidyl acrylates or methacrylates are as above.

Alternative to, or in conjunction with the carboxy functional monomers, acid as paratoluenesulfonic acid or phosphoric acid may be used to enhance self-crosslinking of the acrylic graft portion, especially by catalyzing the acrylamide functionality during curing.

The remaining grafting monomers comprising at least 3 mole percent serve as modifying monomers that can reduce the cost of the graft copolymer as well as adjust the density of crossklinking and glass transition properties of the cured copolymer. Suitable monomers are chosen from widely diverse monomers and include esters corresponding to the formula:

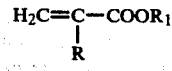

wherein R is hydrogen or methyl and $R_1$ is $C_1$-$C_8$ alkyl. Other modifying monomers include epoxy acrylates or methacrylates, nitriles, and vinylaromatics as monovinylstyrene, monovinyltoluene and α-methylstyrene. Normally, however, vinyl aromatics are less desirable than other modifying monomers as above described, due to an apparent reduction of grafting efficiency. Accordingly, aliphatic modifying monomers are normally preferred.

C. Graft Polymerization

The graft copolymer is made using a dissolved or dispersed aliphatic conjugated diolefin polymer in nonaqueous medium. Polar medium is preferred for efficient grafting, examples including ether alcohols as butylcellosolve as well as higher ketones, particularly methyl amyl ketone. Hydrocarbon solvents as toluene, heptane or xylene in major amounts are less desirable as they may lead to higher viscosities that can limit the solids content of the final primer formulation.

Optimum results are seen with a mixed polymerization catalyst system. Grafting polymerization initiators used alone lead in certain embodiments to undesirable gel formation and it is found that a combination of such grafting initiator as, for example, benzoyl peroxide with a nongrafting initiator as 2,2′ Azobis (2-methylpropionitrile) leads to gel-free graft copolymers. Other grafting catalysts may include alkyl peroxide as tertiary-butylperoxide. Gelation as measured by high viscosity during polymerization is further suppressed in the systems with organometallics as copper naphthenate.

D. Optional Ingredients

Besides the usual ingredients of primer formulations as pigments, fillers, diluents, solvents, solubilizing aids, catalysts and the like, certain optional modifiers may be further included in the graft copolymer systems to enhance properties of the primer composition as well as the cured films.

1. Added Conjugated Diolefin Polymer

Additional aliphatic conjugated diolefin polymer, for instance, may be included at up to about 40% by weight of the graft copolymer, more preferably up to 20% by weight of the graft copolymer to increase solids content of nonaqueous primer formulations without undesirably affecting the cured film properties. The preferred conjugated diolefin polymer is one similar in characteristics to the one used for graft polymerization as above described. It is especially preferred to use the same aliphatic conjugated diolefin polymer. The additional aliphatic conjugated diolefin polymer is desirably added after preparation of the graft copolymer.

2. Additional Crosslinking Agents

The primer compositions may be formulated to include additional crosslinking agents as amino resins. A preferred crosslinking agent includes alkylated melamines, particularly, for example, butylated melamines. Urea formaldehyde or thiourea formaldehyde crosslinkers may also be used.

Use of additional crosslinking agents generally increases toughness and adhesion both to top coat and substrate. The crosslinking agents are preferably employed at about 5–35% by weight, more preferably 10–20% by weight of the weight of the graft copolymer.

3. Hydroxy Functional Silicones

Physical properties such as heat stability, moisture resistance, weatherability, and corrosion resistance are further enhanced through the inclusion in the primer compositions of hydroxy functional silicones. The hydroxy functional silicones may be included during polymerization process or blended thereafter into the compositions to achieve these improvements.

The hydroxy functional silicones preferably employed comprise those with number average molecular weights up to about 5000, more preferably up to about 2500, and contain functionality as

$$\equiv Si-OH$$

A particularly preferred hydroxy functional silicone is Z-6018 Intermediate marketed by Dow Corning. Other disclosures of a more general character along with specific hydroxy functional silicones suitable herein appear in U.S. Pat. Nos. 3,318,971 and 3,468,836 which are hereby herein incorporated by reference. Preferred hydroxy silicones have a molecular weight (number average) of about 1000–2000. They should be desirably soluble in polar and non-polar solvents.

The hydroxy functional silicones are preferably employed at up to about 20% by weight of the graft copolymer weight. When physically blended, they are added during conventional formulation of the primer composition. When included directly with the graft copolymer they may be added during polymerization but are preferably added thereafter with the graft copolymer at temperatures up to about 120° C.

E. Application of Primer Composition

The primer compositions of this invention may be applied to substrates using conventional industrial techniques including spray, dip, curtain and the like and the compositions have good pot life. Curing is desirably at 180° C. or below at about 10–30 minutes and catalysts may speed the oxidative cure of the aliphatic conjugated diolefin polymer portion of the graft copolymer.

The primer compositions may be applied to bare steel as well as conventional conversion coatings as phosphated coated steel. The primer coat is desirably between about 0.8–1.2 mils thick although thinner or thicker film coatings may be used in certain instances.

F. Primer Coat Properties

Desirably, the alkaline resistance and therefore corrosion resistance can be enhanced through certain modifications of the graft copolymer as well as primer composition.

As previously mentioned, added crosslinking agents can serve to improve the film properties. Also, added hydroxy silicones can serve to improve film properties. Still further, in other instances added aliphatic conjugated diolefin polymer can serve to increase solid content.

Another route for improved film properties includes modification of the ratio of hydroxy functional monomer, normally acrylic or methacrylic functional hydroxy monomer, to acrylamide functional monomer. The level of hydroxy functionality in the graft copolymer can dramatically improve alkaline resistance of the cured film. Desirably, there is above about 0.1, preferably 0.5 or more, e.g. 1.5 hydroxy functional monomers for each acrylamide monomer to achieve a greater level of alkaline resistance of the cured system.

The following examples illustrate preferred aspects of this invention and are not intended as limiting the scope thereof. Those in the art will appreciate that many modifications of these illustrative examples can be made without departing from the scope of the invention hereinbefore and hereinafter disclosed.

EXAMPLE 1

A heat curable, self-crosslinked resin is prepared as the procedures hereinafter set forth. A reaction vessel equipped with a stirrer, an inert gas inlet tube, a thermometer, and a dropping funnel is used. To the reactor, the following ingredients are charged.

| Materials | Parts by Weight |
|---|---|
| Ricon 157[1] | 55.3 |
| Copper Naphthenate[2] | 0.2 |
| Methyl amyl ketone | 23.7 |

The mixture in the reaction vessel is heated to $100°\pm 5°$ C. with stirring under nitrogen atmosphere. 0.2 part of benzoyl peroxide is dissolved in 4.9 parts of methyl amyl ketone and added to the reaction vessel. The mixture is then held for approximately two minutes at $100°\pm 5°$ C.

Acrylic monomer mixture as listed in the following table is added dropwise into the heated solution mixture for a period of thirty minutes.

| Materials | Parts by Weight |
|---|---|
| Methyl Methacrylate | 6.1 |
| N-(isobutoxymethyl) acrylamide | 3.6 |
| Hydroxy propyl methacrylate | 4.0 |
| Acrylic acid | 0.2 |
| 2,2'Azobis-(2-methyl propionitrile) | 0.8 |
| Methyl amyl ketone | 1.0 |

After monomer addition, the reaction is continued for another four hours. The grafted polymer is discharged and stored. A Gardner-Holdt viscosity of W is obtained.

The grafted polymer, when cast on bare, unpolished steel cured at 180° C. for twenty minutes, gives a clear, tough film with amber color. Solvent resistance is excellent. No visible defect is observed with 200 double methyl ethyl ketone rubs. Mandrel bending of the grafted polymer film on metal substrate does not show any sign of stress whitening. Film obtained by spraying and cured under the conditions mentioned above on bare, unpolished steel gives excellent results on exposure to humidity (in this case, a Cleveland condensing humidity cabinet is used). No loss of adhesion is observed after 240 hours at $50°\pm 1°$ C. (water temperature). The film stays clear and tough.

A separate reaction is carried out under exactly the same condition and composition as outlined above for the grafting process except that the polybutadiene is withheld and added after the completion of the acrylic part. Liquid polybutadiene (Ricon 157) is then added to the acrylic solution at the end of the post reaction and at the reaction temperature. A physical separation is observed upon storage of the polymer and film cast on metal substrate exhibits opaque and waxy appearance after curing.

The polybutadiene used in this grafting polymerization cures under oxidation condition at 180° C. with good physical properties at a film thickness below 1.0 mil.

An acrylic copolymer is synthesized under the procedure outlines in the following: A reaction vessel equipped the same as mentioned above in the grafting polymerization reaction is used.

40 parts of isopropanol is charged to the reaction vessel and heated to reflux. The following monomer mixture is added dropwise for 85 minutes at refluxing temperature.

| Materials | Parts by Weight |
|---|---|
| Methylmethacrylate | 14.4 |
| Acrylic Acid | 1.8 |
| Butyl methacrylate | 15.0 |
| Butyl acrylate | 15.0 |
| N-(isobutoxymethyl) acrylamide | 7.8 |
| Hydroxypropylmethacrylate | 6.0 |
| Phosmor M[3] | 0.3 |
| t-butylperoctoate | 1.8 |

After monomer addition, the reaction is continued for another two hours. The addition of phosmor-M is to promote adhesion to base steel. This copolymer has good resistance properties and adhesion.

The acrylic graft polybutadiene, the polybutadiene (Ricon 157), and the acrylic copolymer when subjected to cathodic Alkaline Resistance test as described by J. V. Petrocelli et. al. in Journal of Paint Technology Vol. 40, No. 519, PP. 174–186, April, 1968, give the following results.

| Alkaline Resistance Test Results[a] | | |
|---|---|---|
| Polymer System | Film Thickness ($\mu$m) | Loss of[b] Adhesion (mm) |
| Polybutadiene (Ricon 157) | 28 | 7.5 |
| Acrylic Copolymer | 30 | 8.5 |
| Acrylic Graft Polybutadiene | 30 | 1.8 |

[a]All tests on cold rolled, bare clean and unpolished steel (Oxy Metal Industries, Corp.)
[b]Numerical value in mm. is distance delaminated from scribe line after 8 hours test at room temperature.

A significant improvement in alkaline resistance is observed when acrylic functional monomers are grafted onto this liquid polybutadiene.

A primer paint using the above graft polybutadiene is formulated in the following manner: The following ingredients are charged to a laboratory pebble mill and milled for at least 16 hours or to a Hegman reading of 6 to 7.

| Materials | Parts by Weight |
|---|---|
| Graft polybutadiene polymer | 22.9 |
| Methyl amyl ketone | 23.1 |
| Methyl ethyl ketone | 30.0 |
| Carbon black (Pearls 607)[4] | 1.0 |
| Zinc chromate | 3.8 |
| Busan 11-MI[5] | 2.4 |
| Silica | 4.8 |
| Clay | 4.8 |
| Barium sulfate | 7.2 |

The primer paint has a viscosity of 16 seconds (No. 4 Ford Corp.), and is sprayed by conventional spraying equipment onto steel substrate with phosphated conversion coatings. Curing schedule is twenty minutes at 180°

C. The coatings so obtained exhibit excellent adhesion and resistance properties. No loss of adhesion along the scribe line is observed after 240 hours of condensing humidity and standard salt spray tests.
(1) Ricon 157 is a liquid polybutadiene produced by Colorado Chemical Specialties, Inc.
(2) Copper naphthenate, 8% copper is a product of Mooney Chemicals, Inc.
(3) Phosmor M is a product of Yushi Seihin K.K. a subsidiary of Nipon Oil and Fats Ltd.
(4) Black Pearls 607 is a product of Cabot Corp.
(5) Busan 11-MI is a modified barium metaborate produced by Buckman Laboratory, Inc.

EXAMPLE 2

The grafting reaction in Example 1 is repeated and methyl amyl ketone is replaced by butyl cellosolve. A Gardner-Holdt viscosity of Z3–Z4 is obtained. The resulting resistance properties are essentially the same except a higher viscosity is obtained.

EXAMPLE 3

The grafting reaction in Example 1 is repeated except that the Ricon 157 is replaced by Ricon 150[1]. A fifty percent by weight of solid content is designed instead of the seventy percent by weight as in Example 1.
(1) Ricon 150 is a liquid polybutadiene produced by Colorado Specialties, Inc.
Almost similar physical and resistance properties are obtained as in Example 1.

EXAMPLE 4

The grafting polymerization procedures of Example 1 are again repeated with the differences in monomer composition as listed below.

| Materials | Parts by Weight | | |
|---|---|---|---|
| | A | B | C |
| Methylmethacrylate | 6.9 | 6.7 | 3.3 |
| N-(iso-butoxymethyl) acrylamide | 5.3 | 3.6 | 5.4 |
| Hydroxypropyl methacrylate | 2.0 | 3.3 | 1.6 |
| Acrylic Acid | 0.2 | 0.2 | 0.2 |
| Acrylonitrile | — | — | 3.3 |

The resistance properties of the grafted polymer that is obtained from Example 4A, Example 4B, and Example 1 are progressively improved, especially for the condensing humidity and alkaline resistance tests on bare steel.

EXAMPLE 5

The grafting procedures of Example 1 are again followed with the difference that the ratio of polybutadiene to acrylic are 75/25 and 70/30. No significant differences in alkaline resistance except that the end viscosity is progressively increased.

EXAMPLE 6

Organo silicone intermediate (Dow Corning Z6018) is physically blended into the grafted polymer as below. A 70% by weight of solution is prepared and added to the grafted polymer of Example 4A & B by stirring. The alkaline resistance test is carried out and results are listed below:

| Materials | Results of Alkaline Resistance Test (mm)[1] |
|---|---|
| Grafted polymer from Ex. 4A | 3.0 |
| 5% by weight of Z6018[2] physically blended into grafted polymer of Ex. 4A | 1.5 |
| Grafted polymer from Ex. 4B | 2.2 |
| 5% by weight of Z6018[2] physically blended into grafted polymer of Ex. 4B | 1.5 |

[1] Refer to Example 1 (a) & (b).
[2] Z6018 is a product of Dow Corning Corp.

From these blending, films cast on metal substrate maintain clarity and resistance properties.

EXAMPLE 7

The procedures of primer paint formulation of Example 1 is repeated with the exception that 5% by weight based on resin solid of organo silicone intermediate (Dow Corning Z6018) is blended into the system. The paint is sprayed on phosphated steel substrate and cured at 180° C. for 20 minutes. Excellent physical and resistance properties are obtained. No loss of adhesion along the scribe line after 240 hours of condensing humidity and standard salt spray tests is observed.

EXAMPLE 8

An acrylic graft polybutadiene with hydroxy organo silicone intermediate added during polymerization is prepared as outlined in the following procedures:
A reaction vessel equipped with a stirrer, a thermometer, an inert gas tube, and a dropping funnel is charged with the following ingredients.

| Materials | Parts by Weight |
|---|---|
| Ricon 157[1] | 52.6 |
| Methyl amyl ketone | 22.5 |
| Copper naphthonate | 0.1 |

The mixture is brought to 100°±5° C. under nitrogen atmosphere with stirring. 0.2 part of benzoyl peroxide dissolved in 4.7 parts of methyl amyl ketone is added to the heated mixture. The following monomer mixture is added dropwise to the reaction vessel two minutes after the addition of the peroxide solution for approximately 30 minutes.

| Materials | Parts by weight |
|---|---|
| Methyl amyl ketone | 1.0 |
| 2,2' Azobis-(2-methyl propionitrile) | 0.8 |
| Methylmethacrylate | 5.1 |
| N-(isobutoxymethyl) acrylamide | 3.4 |
| Hydroxy propyl methacrylate | 4.5 |
| Acrylic Acid | 0.2 |

The polymerization reaction is continued for two hours after the monomers addition. A 70% by weight of solution of Dow Corning Z6018 in methyl amyl ketone is prepared and 4.9 parts are added to the reaction mixture at 100°±5° C. The reaction is then continued for another two hours. The grafted polymer so obtained is cooled, strained, and stored. A Gardner-Holdt viscosity of W is obtained.

Eight hours of alkaline resistance test as described in Example 1 on bare steel give a 1.5 mm delamination away from the scribe line. Clear film cast on bare steel exhibits good clearity and no loss of adhesion is found after 240 hours in condensing humidity. Chemical resistance properties are also excellent.

Primer paint formulations with and without chromate pigments are prepared and described hereinafter set forth.

The following ingredients are mixed and charged to a standard grinding mill and ground to a Hegman reading of 6 to 7.

| Materials | Parts by Weight A | B |
|---|---|---|
| Carbon black (Pearls 607)[1] | 0.8 | 0.8 |
| Silica | 14.0 | 14.0 |
| Brown Iron Oxide | 17.0 | 17.0 |
| Clay | 27.5 | 16.9 |
| Barium Sulfate | 25.0 | 25.0 |
| Toluene | 30.0 | 30.0 |
| Grafted polymer from above | 30.0 | 30.0 |
| Zinc chromate | — | 10.6 |

[1] As defind in Example 1.

Both of the above mill bases are let down by 36 parts of grafted polymer and diluted with 20 parts of toluene. The final Ford Cup (No. 4) viscosity is 18 seconds. The paint is sprayed with conventional spraying equipment on phosphated steel substrate and cured twenty minutes at 180° C. Excellent resistance properties are obtained. No loss of adhesion along the scribe line is observed after 240 hours of condensing humidity and salt spray tests. Only slight rust spots are observed along the scribe line on the case "A" but without loss of adhesion. Other properties are essentially identical.

EXAMPLE 9

10% by weight of Cymel 301[1] is added to the grafted polymer from Examples 1, 4B, and 8. Films cast on bare steel exhibit excellent clarity and resistance properties. No loss of adhesion is observed after 240 hours in condensing humidity.

Using the pigmentation of Example 8B with added Cymel 301 gives essentially the same resistance properties while improving gravelometer impact resistance.
(1) Cymel 301 is a product of American Cyanamid Co.

EXAMPLE 10

The procedures of Example 9 are repeated with the sole difference that Cymel 301 is replaced by A35130[1]. Essentially similar results are observed. (1) A35130 is a product of Ford Motor Co. A butylated melamine.

EXAMPLE 11

The procedures of Example 9 are again repeated with the difference that Cymel 301 is replaced by Cargil 3348[1]. Similar results are observed. (1) Cargil 3348 is a urea formaldehyde produced by Cargil Co.

EXAMPLE 12

A comparison of initial viscosity with and without polybutadiene blend is listed below. All solutions are diluted to 50% by weight with methyl ethyl ketone.

| Materials | Viscosity (No. 4. Ford Cup) |
|---|---|
| Grafted polymer from Ex. 4B | 51 sec. |
| Grafted polymer from Ex. 4B with 20% of Ricon 157[1] | 29 sec. |

[1] Defined in Example 1.

EXAMPLE 13

Two heat curable coatings are formulated with and without blended in polybutadiene for the comparison of viscosity and resistance properties. The procedures are hereinafter set forth:

The following ingredients are charged to a standard dispensing vessel and ground to a Hegman reading of 6 to 7.

| Materials | Parts by Weight A | B |
|---|---|---|
| Grafted polymer from Ex. 4B | 31.7 | 25 |
| Pearls 607[1] | 1.1 | 1.1 |
| Busan 11-MI[2] | 28.4 | 28.4 |
| Silica | 21.8 | 21.8 |
| Clay | 25.1 | 25.1 |
| Barium Sulfate | 32.8 | 32.8 |
| Methyl ethyl ketone | 37.9 | 41.7 |
| Butyl cellosolve | 27.4 | 30.3 |

[1] Defined in Example 1.
[2] Defined in Example 1.

The mill base in case "A" is let down by 73.9 parts of grafted polymer from Example 4B and has a Ford Cup (No. 4) viscosity of 110 seconds, whereas the mill base in Case "B" is let down by 59.4 parts of grafted polymer from Example 4B and 14.6 parts of Ricon 157 and has an end viscosity of 53.3 seconds.

Both coatings are sprayed on bare steel substrate and cured at 180° C. for 20 minutes and subjected to condensing humidity test for 240 hours. As well as no loss of adhesion is observed no significant difference in resistance properties between the two formulations. In this example, the blend with added polybutadiene in the formulation shows better physical properties at film thickness below 1.2 mil.

EXAMPLE 14

The procedures of Example 1 are repeated with the following differences: The following ingredients are charged to the reactor:

| Materials | Parts by Weight |
|---|---|
| Ricon 157[1] | 35 |
| Copper naphthenate | 0.2 |
| Butyl Cellosolve | 43.7 |

The mixture in the reaction vessel is heated to 100°±5° C. with stirring under nitrogen atmosphere. 0.2 part of benzoyl peroxides is dissolved in 4.9 parts of butyl cellosolve and added to the reaction vessel. The mixture is then held for approximately two minutes at 100°±5° C.

Acrylic monomer mixture as listed in the following table is added dropwise into the heated solution mixture for a period of thirty minutes.

| Materials | Parts by Weight |
|---|---|
| Ricon 157[1] | 35 |

| Materials | Parts by Weight |
|---|---|
| Copper naphthenate | 0.2 |
| Butyl Cellosole | 43.7 |

After monomer addition, the reaction is continued for another two hours. The grafted polymer is discharged and stored. To a hundred parts of the above grafted solution polymer are added 2.7 parts of 2-+-(dimethylamino) ethanol with stirring. 97.3 parts of deionized water are then added slowly under high shear condition. A 25% solid (by weight, by calculation) water dispersion resin is thus obtained. The resin can be further formulated into a water-borne coating, applied under conventional techniques and cured 180° C. for 20 minutes. The coating essentially has similar physical properties as described in Example 1. Similar modification of the system as applied to Example 1 such as added melamine or urea formaldehyde crosslinkers, silicone intermediates, etc., can also be applied to this water-borne system.

What is claimed is:

1. An alkaline resistant primer composition comprising a graft copolymer that has a self-crosslinking portion that is about 10–60% by weight of the graft copolymer, the graft copolymer made by reacting in the presence of polymerization catalyst and under non-aqueous conditions:
   (A) aliphatic conjugated diolefin polymer having a number average molecular weight between about 1000–20,000 wherein about 40–90% of the aliphatic diolefin units are in 1,2 vinyl configuration;
   (B) olefinically unsaturated grafting monomers, co-polymerizable with one another, comprising (i) about 10–40 mole percent of acrylamide monomers corresponding to the formula

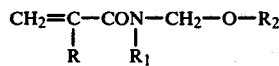

wherein R is a hydrogen or methyl, $R_1$ is hydrogen or $C_1$–$C_{18}$ alkyl, $R_2$ is hydrogen or $C_1$–$C_8$ alkyl; (ii) about 5–40 mole percent of hydroxy functional monomers, (iii) about 0–25 mole percent of carboxy functional acrylic monomers and (iv) at least about 3 mole percent of one or more esters of acrylic or methacrylic acid and $C_1$–$C_8$ aliphatic alcohols, wherein there are above about 0.1 hydroxy groups in the graft copolymer for each amide group of (i).

2. The primer composition in accordance with claim 1, wherein B(iii) comprises 3–15 mole percent acid selected from acrylic or methacrylic acid or combinations thereof.

3. The primer composition in accordance with claim 1, which further comprises, in addition to the graft copolymer, a normally liquid aliphatic conjugated diolefin polymer.

4. The primer composition in accordance with claim 3, which further comprises, in addition to the graft copolymer an amino resin crosslinking agent at about 10–30% by weight of the graft copolymer.

5. The primer composition in accordance with claim 1, which further comprises a hydroxy functional copolymer comprising silicone in the form of ≡Si—OH with a number average molecular weight below about 2500.

6. The primer composition in accordance with claims 1 or 2 or 3 or 4 or 5, wherein (ii) comprises hydroxy functional monomers corresponding to the formula:

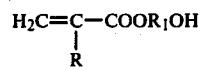

wherein R is hydrogen or methyl; $R_1$ is a divalent hydrocarbon of up to about 8 carbons.

7. The primer composition in accordance with claim 1, which further comprises amino resin crosslinking agent.

8. The primer composition in accordance with claim 7, wherein B(iii) comprises about 3–15 mole percent acid selected from acrylic and methacrylic acid.

9. A coated metal substrate comprising a topcoat and in between the topcoat and the surface of the metal substrate, an alkaline resistant primer made by curing a primer composition comprising a graft copolymer that has a self-crosslinking acrylic portion that is about 10–60% by weight of the graft copolymer, the graft copolymer made by reacting in the presence of polymerization catalyst and under non-aqueous conditions:
   (A) aliphatic conjugated diolefin polymer having a number average molecular weight between about 1000–20,000 wherein about 40–90% of the aliphatic diolefin units are in 1,2 vinyl configuration;
   (B) olefinically unsaturated grafting monomers, co-polymerizable with one another, comprising (i) about 10–40 mole percent of acrylamide monomers corresponding to the formula

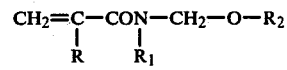

wherein R is hydrogen or methyl, $R_1$ is hydrogen or $C_1$–$C_8$ alkyl, $R_2$ is hydrogen or $C_1$–$C_8$ alkyl; (ii) about 5–40 mole percent hydroxy, functional monomers; (iii) about 0–25 mole percent of carboxy functional acrylic monomers and (iv) at least about 3 mole percent of one or more esters of acrylic or methacrylic acid and $C_1$–$C_8$ aliphatic alcohols wherein there are above about 0.1 hydroxy groups in the graft copolymer for each amide group of (i).

10. The metal substrate in accordance with claim 9, wherein B(iii) comprises 3–15 mole percent acid selected from acrylic or methacrylic acid or combinations thereof.

11. The metal substrate in accordance with claim 9 wherein the primer composition further comprises, in addition to the graft copolymer, a normally liquid aliphatic conjugated diolefin polymer.

12. The metal substrate in accordance with claim 9, wherein the primer composition further comprises, in addition to the graft copolymer, an amino resin crosslinking agent at about 10–30% by weight of the graft copolymer.

13. The metal substrate in accordance with claim 9, wherein the primer composition further comprises a hydroxy functional copolymer comprising silicone in the form of ≡Si—OH with a number average molecular weight below about 2500.

14. The metal substrate in accordance with claims 9 or 10 or 11 or 12 or 13, wherein (ii) comprises hydroxy functional monomers corresponding to the formula:

$$H_2C=C-COOR_1OH$$
$$\phantom{H_2C=C-}|$$
$$\phantom{H_2C=C-}R$$

wherein R is hydrogen or methyl; $R_1$ is divalent hydrocarbon of up to about 8 carbons.

15. The metal substrate in accordance with claim 13 wherein the primer composition further comprises amino resin crosslinking agent.

16. The metal substrate in accordance with claim 15, wherein B(iii) comprises about 3-15 mole percent acid selected from acrylic and methacrylic acid.

17. A process for making a graft polymer comprising a self-crosslinking acrylic portion that is about 10-60% by weight of the graft copolymer which comprises reacting in the presence of polymerization catalyst and under non-aqueous conditions:

(A) a normally liquid aliphatic conjugated diolefin polymer wherein about 40-90% of the aliphatic diolefin units are in 1,2 vinyl configuration;
(B) olefinically unsaturated grafting monomers, copolymerizable with one another, comprising (i) 10-40 mole percent one or more acrylamides corresponding to the formula $$CH_2=C-CON-CH_2-O-R_2$$
$$\phantom{CH_2=C-}|\phantom{CON-}|$$
$$\phantom{CH_2=C-}R\phantom{CON-}R_1$$

wherein R is hydrogen or methyl, $R_1$ is hydrogen or $C_1$-$C_8$ alkyl, $R_2$ is hydrogen or $C_1$-$C_8$ alkyl; (ii) about 5-40 mole percent of hydroxy functional monomers; (iii) about 0-25 mole percent of one or more carboxy functional acrylic monomers; and (iv) at least about 3 mole percent of one or more esters of acrylic or methacrylic acid and $C_1$-$C_8$ aliphatic alcohols, wherein there are at least about 0.1 hydroxy groups in the graft copolymer for each amide group of (i).

18. The process in accordance with claim 17, wherein B(iii) comprises 3-15 mole percent acid selected from acrylic or methacrylic acid or combinations thereof.

* * * * *

UNITED STATES PATENT AND TRADEMARK OFFICE
CERTIFICATE OF CORRECTION

PATENT NO. : 4,178,318
DATED : December 11, 1979
INVENTOR(S) : Mo-Fung Cheung

It is certified that error appears in the above-identified patent and that said Letters Patent are hereby corrected as shown below:

Column 8, line 26, delete "base" and insert -- bare --.
Column 8, line 66, delete "corp" and insert -- cup --.
Replace the table bridging Columns 12 and 13 with:

| Materials | Parts by Weight |
|---|---|
| methyl methacrylate | 4.3 |
| n(isobutoxy methyl) acrylamide | 3.7 |
| Hydorxy propyl methacrylate | 4.0 |
| Acrylic Acid | 2.2 |
| 2,2' Azobis-(2-methyl propionitrile) | 0.8 |
| Methyl ethyl Ketone | 1.0 |

Column 13, line 45, delete "$C_{18}$" and insert -- $C_8$ --.

*Signed and Sealed this*

Eighteenth Day of November 1980

[SEAL]

Attest:

SIDNEY A. DIAMOND

Attesting Officer

Commissioner of Patents and Trademarks